United States Patent
Wernersson

(10) Patent No.: US 7,652,274 B2
(45) Date of Patent: Jan. 26, 2010

(54) OPTICAL DEVICE

(75) Inventor: Mats Wernersson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

(21) Appl. No.: 11/883,457

(22) PCT Filed: Feb. 3, 2006

(86) PCT No.: PCT/EP2006/001100

§ 371 (c)(1),
(2), (4) Date: Jul. 17, 2008

(87) PCT Pub. No.: WO2006/082112

PCT Pub. Date: Aug. 10, 2006

(65) Prior Publication Data

US 2009/0008530 A1    Jan. 8, 2009

Related U.S. Application Data

(60) Provisional application No. 60/652,682, filed on Feb. 14, 2005.

(30) Foreign Application Priority Data

Feb. 3, 2005    (EP) .................................. 05388009

(51) Int. Cl.
*G03B 15/02*    (2006.01)
*H04M 1/02*    (2006.01)
*H04N 5/225*    (2006.01)

(52) U.S. Cl. .............................. 250/552; 362/3; 362/11; 362/800; 396/62; 396/175; 396/429

(58) Field of Classification Search .............. 250/208.1, 250/552; 362/3, 16, 17, 18, 7, 11, 800; 396/176–178, 396/61, 62, 175, 429
See application file for complete search history.

(56) References Cited

U.S. PATENT DOCUMENTS 4,860,039 A * 8/1989 Hata et al. ................... 396/297

(Continued)

FOREIGN PATENT DOCUMENTS

EP    1 486 820    12/2004

(Continued)

OTHER PUBLICATIONS

Ertürk, S., *Digital Image Stabilization with Sub-Image Phase Correlation Based Global Motion Estimation*, IEEE Transactions on consumer Electronics, vol. 49, No. 4, Nov. 2003, pp. 1320-1325.

(Continued)

*Primary Examiner*—John R Lee
(74) *Attorney, Agent, or Firm*—Myers Bigel Sibley & Sajovec

(57) ABSTRACT

An optical device for use with an imaging device for taking photographic images of an object includes a light emitting element capable of emitting light, and a lens arranged so as to direct light from the light emitting element to illuminate the object. The light emitting element may include at least two light emitting zones arranged so that light from the light emitting zones can be directed from the lens in respective corresponding spatial angles, and that the light emitting zones can be individually and selectively controlled to emit a controllable intensity of light.

18 Claims, 2 Drawing Sheets

U.S. PATENT DOCUMENTS

| | | | |
|---|---|---|---|
| 5,019,845 A * | 5/1991 | Asakura et al. | 396/175 |
| 5,649,238 A * | 7/1997 | Wakabayashi et al. | 396/61 |
| 6,035,135 A | 3/2000 | Okamura | 396/61 |
| 7,046,926 B2 * | 5/2006 | Chikugawa | 396/175 |
| 7,052,151 B2 * | 5/2006 | Terada et al. | 362/16 |
| 7,284,871 B2 * | 10/2007 | Oon et al. | 362/17 |
| 7,461,948 B2 * | 12/2008 | van Voorst Vader et al. | 362/244 |
| 7,510,289 B2 * | 3/2009 | Takekuma | 362/4 |
| 2003/0043290 A1 | 3/2003 | Sasaki | 348/345 |
| 2004/0085745 A1 * | 5/2004 | Yoshihara | 362/8 |
| 2004/0245430 A1 | 12/2004 | Konishi | 250/201.2 |
| 2008/0232079 A1 * | 9/2008 | Awazu | 362/3 |
| 2009/0008530 A1 * | 1/2009 | Wernersson | 250/201.2 |

FOREIGN PATENT DOCUMENTS

| | | |
|---|---|---|
| EP | 1 503 579 | 2/2005 |
| GB | 2376592 | 12/2002 |
| JP | 02315327 | 5/1990 |
| JP | 02239239 | 9/1990 |
| JP | 05150297 | 6/1993 |
| JP | 2002369048 | 12/2002 |
| JP | 2003066519 | 3/2003 |
| JP | 2004064460 | 2/2004 |

OTHER PUBLICATIONS

International Preliminary Report on Patentability for PCT/EP2006/001100 dated Apr. 11, 2007.

* cited by examiner

OPTICAL DEVICE

CROSS-REFERENCE TO RELATED APPLICATIONS

This application is a 35 U.S.C. § 371 national phase application of PCT Application No. PCT/EP2006/001100, filed on Feb. 3, 2006, which claims priority from European Patent Application Serial No. 05388009.2 filed on Feb. 3, 2005, and which claims the benefit under 35 USC § 119(e) of U.S. Provisional Application Ser. No. 60/652,682 filed on Feb. 14, 2005, the disclosures of which are incorporated by reference herein in their entireties. The above-referenced PCT International Application was published in the English language as International Publication No. WO 2006/082112 on Aug. 10, 2006.

TECHNICAL FIELD OF THE INVENTION

The invention relates to optical devices for use with an imaging device such as a camera for taking photographic images of an object and for illuminating the object when taking the image.

DESCRIPTION OF RELATED ART

Traditional analogue and digital cameras use a flash with a discharge tube and a lens, a concave mirror or other focusing device for directing the light from the discharge tube towards the object. Cameras having a lens with a variable focal length (zoom lens) can use a zoom flash, where the focusing device is moved relative to the discharge tube in dependence on the focal length of the camera lens, whereby the spreading angle of the beam of light from the flash is controlled to correspond to the imaging angle of the camera lens. At short focal lengths of the camera lens the flash is controlled to spread the light more than at long focal lengths, whereby substantially only the object that is being photographed is illuminated.

The following definitions of lenses (for imaging or other purposes) are generally accepted and are used throughout this specification:

Wide angle lens: A lens with a (relatively) short focal length, and

Telephoto lens: A lens with a (relatively) long focal length.

Zoom lens: A lens with a variable focal length. When a zoom lens has a short focal length, it may be referred to as a wide-angle lens, and when it has a long focal length, it may be referred to as a telephoto lens.

In e.g. mobile communication devices, such as mobile telephones, small cameras are used, where the available space is limited. A traditional zoom flash as described above with a focusing device that is moveable relative to the light source is not suitable for such use due to its space requirements.

A different type of flash providing a variable light distribution is known from JP 02-135327, where two separate light emitting units arranged next to each other are used in a stroboscopic device. One light emitting unit, which is wide in light distribution, emits light when the photographing lens is set to a wide viewing angle (WIDE position), while the other light emitting unit, which is narrow in light distribution, emits light when the photographing lens is set to a narrow viewing angle (TELE position). Also this device is quite large and thus less suitable for small mobile devices.

Further, although these devices can provide a variable light distribution (wide or narrow spatial angle), the light distribution is more or less centered around the axis of the lens of the camera. Very often a more flexible light distribution would be expedient, because the object to be photographed is not necessarily placed in the middle of the picture to be taken.

Therefore, it is an object of the invention to provide an optical device that is compact enough to be placed in a mobile communications device, and in which the light distribution can be controlled in a more efficient way.

SUMMARY

The invention provides an optical device for use with an imaging device for taking photographic images of an object, the optical device comprising a light emitting element capable of emitting light, and a lens arranged so as to direct light from the light emitting element to illuminate the object with light emitted from the light emitting element, wherein the light emitting element comprises two or more light emitting zones where light from the light emitting zones is directed from the lens in corresponding spatial angles, and the light emitting zones can be individually and selectively controlled to emit a controllable intensity of light.

When a light emitting element with at least two light emitting zones is arranged behind a common lens, and the light emitting zones can be individually and selectively controlled, a very compact device is achieved that can be used in mobile devices, and which allows a very flexible light distribution.

Such an optical device can be used as an independent accessory for an imaging device for taking photographic images of an object, but it can it self comprise an imaging device for taking a photographic image of the object, the imaging device comprising an imaging lens arranged in an imaging relationship with a light sensitive element so as to project light from the object onto the light sensitive element to form an image of the object on the light sensitive element.

The light-emitting element can comprise light emitting diodes or other solid-state light emitting devices, and the light emitting zones may comprise a first light emitting zone and a second light-emitting zone arranged around the first light emitting zone.

In an optical device of the invention the imaging device can be capable of selectively restricting the imaging of objects to a smaller or a larger opening angle of the imaging lens, which is known as zoom. The imaging of objects can be restricted to the smaller or the larger opening angle of the imaging lens by selecting a corresponding portion of the image of the object on the light sensitive element, which is known as digital zoom. When the imaging lens has a variable focal length, the imaging of objects can be restricted to the smaller or the larger opening angle of the imaging lens by selectively varying the focal length of the imaging lens, which is known as optical zoom.

Whether using digital zoom or optical zoom, when the imaging of objects is restricted to the smaller opening angle of the imaging lens, the first light emitting zone can be controlled to emit light, and the second light emitting zone can be controlled not to emit light, and when the imaging of objects is restricted to the larger opening angle of the imaging lens, the first and second light emitting zones are both controlled to emit light.

When the imaging of objects is restricted to the larger opening angle of the imaging lens, preferably the first and second light emitting zones are both controlled to emit light with a first light intensity, and when the imaging of objects is restricted to the smaller opening angle of the imaging lens, the first light emitting zone is controlled to emit light with a second light intensity, and the second light emitting zone is controlled not to emit light. Hereby it is avoided that light from the light-emitting element is used to illuminate objects that are not being imaged on the light sensitive element, and power is saved.

Preferably, the second light intensity is higher than the first light intensity. When the imaging of objects is restricted to the smaller opening angle of the imaging lens, i.e. the imaging device is in a telephoto or zoom-in mode, and the second light emitting zone is controlled not to emit light, it is both possible and advantageous to control the first light emitting zone to emit more light without overheating the light emitting element due to power dissipated in the element.

In an optical device according to the invention the light sensitive element can comprise a charge coupled device, a CMOS device or a film with a light sensitive emulsion on a carrier.

The light emitting zones may be arranged to be controlled manually to emit the controllable intensity of light. This allows a user to select light emitting zones depending on what he finds most appropriate in a given situation.

The optical device may further comprise a distance measuring device arranged to measure a distance to the object, and the light emitting zones may then be arranged to be controlled to emit the controllable intensity of light in dependence of the measured distance. Thus in case of an object located relatively far from the optical device the illumination light can be concentrated on the object by using only one or a few light emitting zones.

The optical device may also be arranged to perform an image analysis of the image formed on the light sensitive element, and in that case the light emitting zones may be arranged to be controlled to emit the controllable intensity of light in dependence of a result of said image analysis. In this way the result of the analysis can be used to either suggest which elementary zones to emit light from or to control the zones directly.

An optical device according to the invention can comprise means for wireless voice communication such as a mobile telephone.

An optical device according to the invention has no moveable parts that require precise adjustment, and it is therefore less sensitive to mechanical shock.

When taking a photograph of an object, e.g. a portrait photograph of a person, with background at a larger distance from the camera lens than the person, the central portion of the light-emitting element will illuminate the person, and the peripheral portion will illuminate the background. The central light emitting zone or zones can be controlled to emit light with a lower intensity than the zones in the peripheral portion, whereby both the person close to the camera and the more distant background can be more uniformly illuminated.

BRIEF DESCRIPTION OF THE DRAWINGS

The invention will now be described more fully below with reference to the drawings, in which.

DETAILED DESCRIPTION OF EMBODIMENTS

Figure 1:
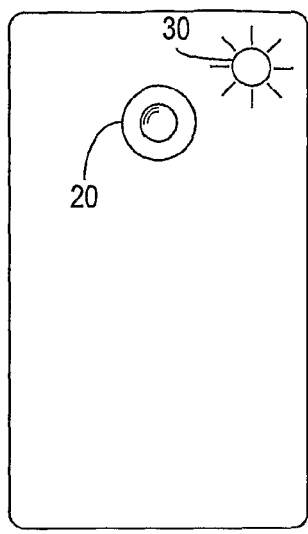
FIG. 1 is a front view of an optical device of the invention.
Figure 2:
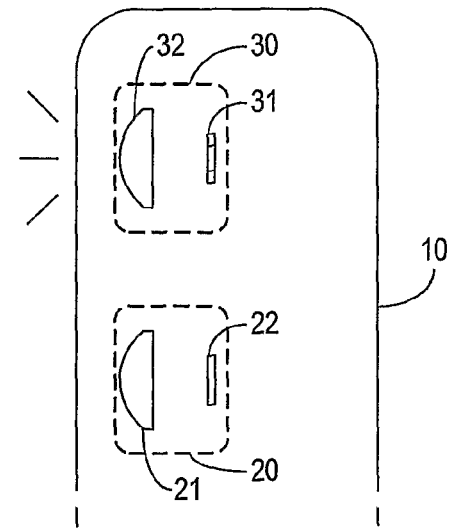
FIG. 2 is a schematical side view of the optical device in FIG. 1.

In FIGS. 1 and 2 is shown the contour of a mobile telephone 10 with a camera 20 or other means for taking photographic images and an illumination device 30 that can be controlled to emit light for illuminating an object to be photographed by the camera 20. The mobile telephone 10 has means for wireless voice communication, which are not shown.

The camera 20 comprises an imaging lens 21 arranged in an imaging relationship with a light sensitive element 22 so as to project light from the object onto the light sensitive element to form an image of the object thereon. In the illustrated example the light sensitive element 22 is e.g. a charge-coupled device (CCD), and the images taken are digital images. Alternatively, the light sensitive element comprises a film with a light sensitive emulsion on a carrier.

The digital camera 20 is capable of zooming, i.e. varying the opening angle, i.e. the spatial angle within which objects are imaged on the light sensitive element 22. Like in other digital cameras this may be done by selecting an appropriate portion, e.g. a central portion, of the image of the object on the light sensitive element for processing in the camera and expanding or stretching the selected image portion before storing the image. This is called digital zoom.

Figure 3:
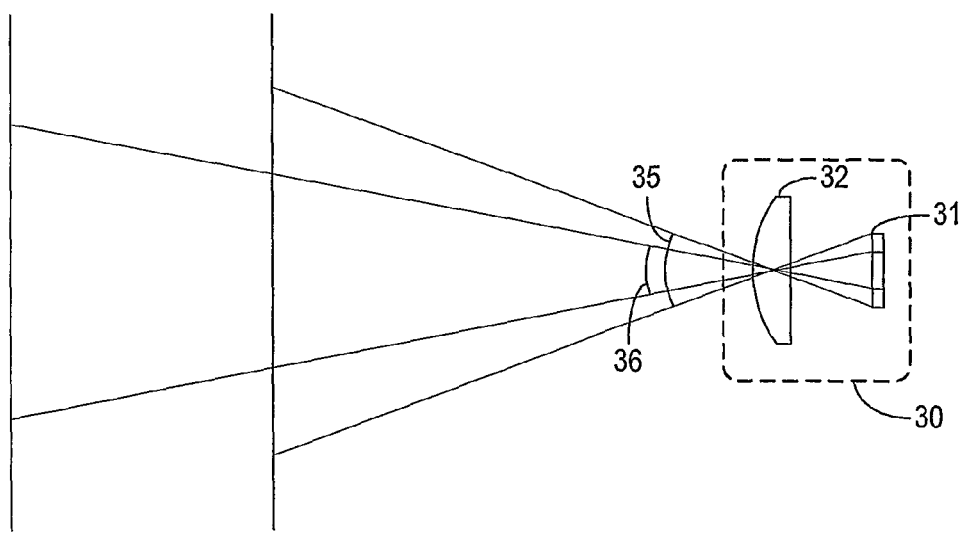
FIG. 3 illustrates the principle of zoom in the optical device in FIG. 1.

In FIG. 3 is shown the illumination device 30 comprising a light-emitting element 31 capable of emitting light, and a lens 32. The lens 32 is arranged so as to direct light from the light-emitting element towards the object to illuminate the object.

Figure 4:
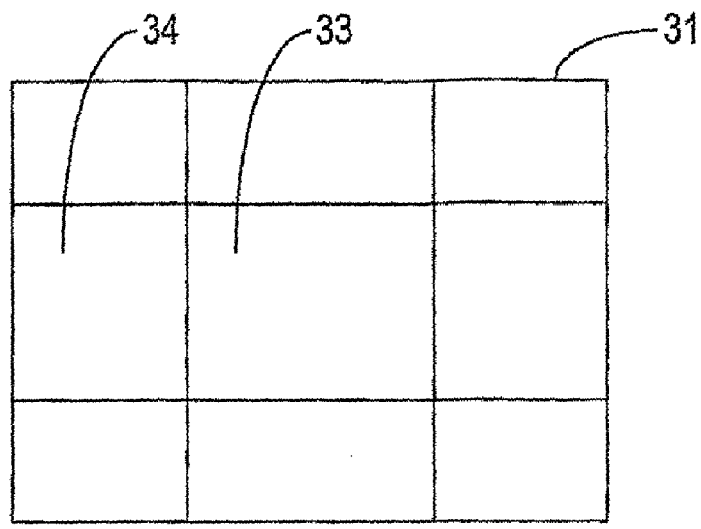
FIG. 4 illustrates a light-emitting element used in the device shown in FIGS. 1-3.

In FIG. 4 is shown the structure of the light emitting element 31, which comprises a first, central light emitting zone 33 and a second light emitting zone 34 arranged around the first light emitting zone. The second light-emitting zone 34 is composed of eight elementary zones, or it can be a contiguous annular zone. Each zone can be individually and selectively controlled to emit a controllable intensity of light. Each of the light emitting zones is a solid-state device such as a light emitting diode, LED.

When the camera is in wide-angle mode, all light emitting zones are controlled to emit light so that light is emitted through the lens in a first, relatively large spatial angle 35 that corresponds to the opening angle of the imaging lens in wide-angle mode of the camera.

When the camera is zoomed to telephoto mode, only the central light emitting zone 33 is controlled to emit light so that light is emitted through the lens in a second, relatively small spatial angle 36 that corresponds to the opening angle of the imaging lens in telephoto mode of the camera. Light from the elementary zones in the outer light emitting zone 34 will not illuminate portions of the object that are being photographed, and these elementary zones are turned off. This saves power.

Typically, the entire light emitting element 31 is capable of dissipating a certain amount of power as heat, and when the outer light-emitting zone 34 is turned off, the power dissipation is reduced. Without exceeding the power dissipation limit for the light-emitting element the central light-emitting zone 33 can then be controlled to emit a higher intensity of light than would otherwise be possible. Thereby the light intensity in the relatively small spatial angle 36 will be correspondingly increased, and more remote objects can thereby be properly illuminated.

The light-emitting element 31 is preferably a segmented light emitting diode (LED), in which the segments can be individually controlled. In the illustrated embodiment the light-emitting element 31 has a central zone 33 and a peripheral zone 34. The light emitting element can have several zones arranged around each other, whereby the light from the illumination device can have several opening angles to correspond more closely to the zoom settings of the camera 20.

The light emitting zones may be individually controlled independent of the zoom settings of the camera 20. Hereby light can be directed in directions where it is needed, e.g. for controlling the distribution of light over the object to be photographed.

Thus as an example, instead of controlling the light emitting zones 33 and 34 in dependence of the zoom settings of the camera as described above, a distance measuring device may be used to control the light emitting zones. If the object to be photographed is located relatively far from the camera only the central light emitting zone 33 is controlled to emit light through the lens, while both zones 33 and 34 can be controlled to emit light when the object is closer to the camera.

The light emitting zones may also be controlled manually by a user who can then select between a mode in which light is emitted only from the central light emitting zone 33 and a mode in which light is emitted from the central light emitting zone 33 as well as the outer light emitting zone 34 depending on what the user finds most appropriate in a given situation.

Figure 5:
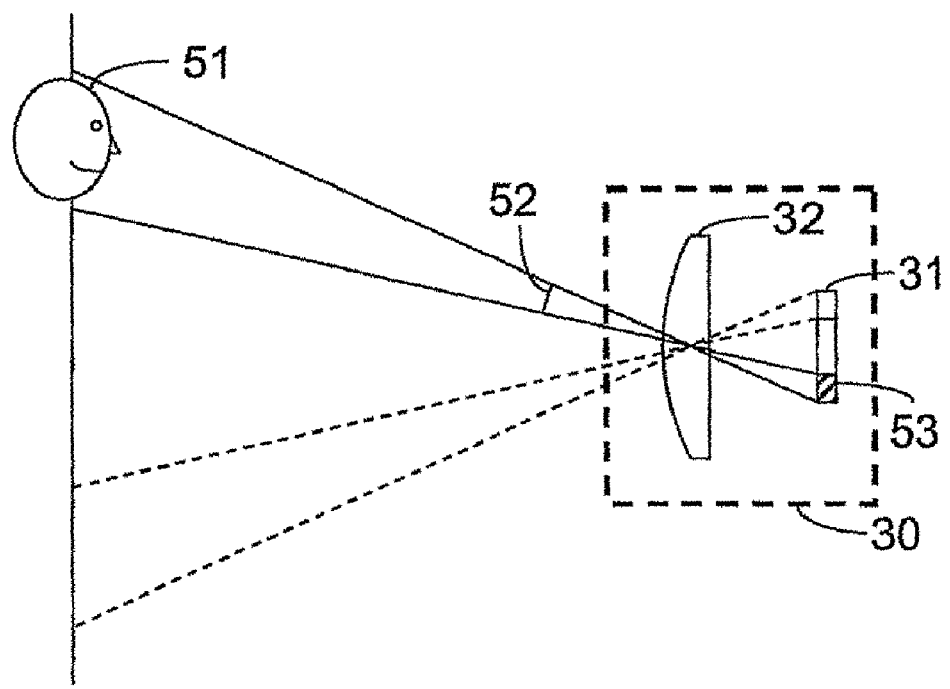
FIG. 5 illustrates an example of the use of individual control of elementary light emitting zoned.

In this case it could also be possible to control each of the nine elementary zones shown in FIG. 4 individually, which allows a user to direct the light in the direction where it is most needed. An example is illustrated in FIG. 5, where a face 51 is to be photographed. The illumination device 30 can thus be set to emit light through the lens 32 in a relatively small spatial angle 52 by controlling one or more of the lower elementary zones, as indicated by 53, to emit light, while the remaining elementary zones are turned off. Again this allows a higher light intensity from the relevant zones than compared to the situation where all zones are used, due to the total allowed power dissipation in the light emitting element 31.

Instead of controlling the individual elementary zones manually, output signals from the light sensitive element 22 can be analysed by an image analysis program, and the result of the analysis can be used to either suggest which elementary zones to emit light from or to control the zones directly. If the image analysis program e.g. detects that the object most likely of interest is located in the upper left corner of the scene, which can be done by comparing the current image with a number of stored reference images, the program could automatically control the corresponding elementary zone to emit light, while the remaining elementary zones are turned off. This ensures that the light is directed in the direction where it is most needed.

The invention is also well suited for use with cameras with optical zoom, i.e. cameras with a zoom lens, and for cameras wherein the light sensitive element comprises a film with a light sensitive emulsion on a carrier.

The illumination device 30 is preferably a module that can be manufactured as a separate component and installed together with the camera 20, which may likewise be a separate component.

Although a preferred embodiment of the present invention has been described and shown, the invention is not restricted to it, but may also be embodied in other ways within the scope of the subject-matter defined in the following claims.

The invention claimed is:

1. An optical device for use with an imaging device for taking photographic images of an object, the optical device comprising:
    a light emitting element configured to emit light and comprising at least two light emitting zones, the at least two light emitting zones arranged so that light from the at least two light emitting zones can be directed in respective corresponding spatial angles, and so that the at least two light emitting zones can be individually and selectively controlled to emit a controllable intensity of light;
    wherein the light emitting element comprises a solid-state light emitting device; and
    wherein the at least two light emitting zones are arranged behind a common lens that is configured to direct light from the at least two light emitting zones at respective corresponding spatial angles to illuminate the object.

2. An optical device according to claim 1, wherein the light emitting element comprises a light emitting diode.

3. An optical device according to claim 1, wherein the at least two light emitting zones comprise a first light emitting zone and a second light emitting zone arranged around the first light emitting zone.

4. An optical device according to claim 3, wherein the second light emitting zone comprises a plurality of elementary zones, each of which can be individually and selectively controlled to emit a controllable intensity of light.

5. An optical device according to claim 1, further comprising an imaging device configured to take a photographic image of the object, the imaging device comprising an imaging lens arranged in an imaging relationship with a light sensitive element so as to project light from the object onto the light sensitive element to form an image of the object on the light sensitive element.

6. An optical device according to claim 5, wherein the imaging device is configured to selectively restrict the imaging of objects to a smaller or a larger opening angle of the imaging lens.

7. An optical device according to claim 6, wherein the imaging of objects is restricted to the smaller or the larger opening angle of the imaging lens by selecting a corresponding portion of the image of the object on the light sensitive element.

8. An optical device according to claim 6, wherein the imaging lens has a variable focal length, and the imaging of objects is restricted to the smaller or the larger opening angle of the imaging lens by selectively varying the focal length of the imaging lens.

9. An optical device according to claim 6, wherein
    the first and second light emitting zones are both controlled to emit light having respective first light intensities when the imaging of objects is restricted to the larger opening angle of the imaging lens, and
    the first light emitting zone is controlled to emit light having a second light intensity, and the second light emitting zone is controlled not to emit light, when the imaging of objects is restricted to the smaller opening angle of the imaging lens.

10. An optical device according to claim 9, wherein the second light intensity is higher than the first light intensity of the light emitted by the first light emitting zone.

11. An optical device according to claim 5, wherein the light sensitive element comprises a charge coupled device.

12. An optical device according to claim 5, wherein the light sensitive element comprises a CMOS device.

13. An optical device according to claim 5, wherein the light sensitive element comprises a film with a light sensitive emulsion on a carrier.

14. An optical device according to claim 1, wherein the light emitting zones are configured to be controlled manually to emit the controllable intensity of light.

15. An optical device according to claim 1, further comprising a distance measuring device configured to measure a distance to the object, and wherein the light emitting zones are configured to be controlled to emit the controllable intensity of light in dependence of the measured distance.

16. An optical device according to claim 1, further configured to perform an image analysis of the image formed on the light sensitive element, wherein the light emitting zones are configured to be controlled to emit the controllable intensity of light in dependence of a result of the image analysis.

17. An optical device according to claim 1, further comprising means for performing wireless voice communication.

18. An optical device, comprising:
   a solid-state light emitting element comprising first and second light emitting zones; and
   a common lens configured to direct light from the first and second light emitting zones towards an object;
   wherein the first light emitting zone and the common lens are arranged to direct light at a first spatial angle;
   wherein the second light emitting zone and the common lens are configured to direct light at a second spatial angle different from the first spatial angle; and
   wherein an intensity of light emitted by the first light emitting zone and an intensity of light emitted by the second light emitting zone are individually and selectively controllable.

* * * * *